United States Patent [19]

Ammann

[11] Patent Number: 4,854,703
[45] Date of Patent: Aug. 8, 1989

[54] LASER BEAM LEVELLING INSTRUMENTS

[76] Inventor: Hans-Rudolf Ammann, Breitenach, 8580 Amriswil, Switzerland

[21] Appl. No.: 140,730

[22] Filed: Jan. 4, 1988

[30] Foreign Application Priority Data

Jan. 19, 1987 [CH] Switzerland .............................. 179/87

[51] Int. Cl.⁴ ................................................ G01C 9/02
[52] U.S. Cl. ..................................... 356/248; 356/138
[58] Field of Search ............... 356/138, 142, 148, 149, 356/150, 152, 153, 248; 33/278, DIG. 21; 350/637

[56] References Cited

U.S. PATENT DOCUMENTS 4,629,321 12/1986 Hart et al. ............................ 356/148

Primary Examiner—F. L. Evans
Attorney, Agent, or Firm—Harold Gell

[57] ABSTRACT

A laser beam levelling instrument, which is not only intended to level but in which the laser beam is inclinable in two axes facing away from one another at right angles, has a self-levelling surveying plate at the lower end of a rotational shaft of the instrument. Disposed on the surveying plate are two spindles, facing away from one another at right angles, at the point of intersection of which there is a joint. At the ends of the two spindles remote from the joint, screw-threaded rods are disposed on the surveying plate on which rods the ends of the spindles can travel vertically. The joint has a center member which is connected to the rotational shaft by means of a pivot and an intermediate member and which is surrounded by a casing which is ball-bearing mounted on the surveying plate on vertical arms. Further disposed on the surveying plate are two spirit levels which are at right angles to one another, each level controlling an electric motor for the self-levelling of the surveying plate.

7 Claims, 2 Drawing Sheets

LASER BEAM LEVELLING INSTRUMENTS

FIELD OF THE INVENTION

This invention relates to a laser-beam levelling instrument having means for producing a laser beam and having rotatable reflection means whereby a vertically incoming laser beam can be deflected into the horizontal and is pivotable in a horizontal plane and further having means for automatically levelling the laser plane, said laser plane being able to be inclined in two axes.

BACKGROUND OF THE INVENTION

Laser-beam levelling instruments of the above-mentioned type serve to determine a horizontal plane or a plane inclined by a desired percentage in at least one direction. In the course of this, the laser beam, which generally emerges invisibly from the instrument, is caused to rotate horizontally by a rotary head. The rotating laser beam can then be received by a receiver and made visible at any desired point around the levelling instrument. Such a laser-beam levelling instrument enables a large number of different surveying and checking tasks to be carried out. The type of instrument here in question, wherein the laser plane can be inclined in two axes, is used primarily in construction work below ground level and, for example, during the levelling of large agricultural areas. Since the reference plane radiated by the laser can be inclined as desired in two axes, that is to say in a transverse gradient and in a longitudinal gradient, an area of ground, whether it be for a car park, a football field or an agricultural field, can be brought to a predetermined transverse and longitudinal gradient, for example in order to ensure the drainage. In this case, checking work can either be done by means of the laser-beam receiver secured to a surveyor's rod or better still the grading work can be controlled by means of a receiver mounted directly on the grading machine.

In former inclinable laser-beam levelling instruments the inclination of the laser reference plane has generally been effected by means of an intermediate member between a tripod and the instrument. In this case, the whole instrument is inclined and the inclination can only be effected in one direction. Now in order to be able to measure the transverse gradient also, the instrument is turned through 90° on the intermediate member. During this rotation, the instrument executes a pendulum-like movement, the lowest point of the pendulum movement being in the middle, that is to say at 45°. If the transverse inclination is to be effected by a different value from the longitudinal inclination, however, a third inclination corresponding to the lowest point of the said pendulum movement must be adjusted at the instrument. According to the two values desired of the transverse and longitudinal gradients respectively, this third value will no longer be in the middle of the 90° angle but nearer to either one end or the other. In order to achieve the particular transverse and longitudinal gradients required, it is necessary to calculate, with reference to a table, in what angular position the third auxiliary inclination value has to be set. This is naturally somewhat complicated.

SUMMARY OF THE INVENTION

The object of the invention is to provide a laser-beam levelling instrument in which a transverse and a longitudinal inclination can be adjusted without any problems and during the adjustment of one inclination, the other remains uninfluenced.

Accordingly, the invention provides a laser-beam levelling instrument compromising a rotational shaft, a self-levelling surveying plate, means for producing a vertical laser beam and rotatable reflection means for deflecting said vertical laser beam into a horizontal beam, said beam deflecting means being mounted on said rotational shaft and said shaft being suspended vertically and pivotable in a horizontal plane, means being provided for the automatic levelling of the surveying plate in a horizontal plane and said surveying plate being able to be inclined in two axes facing away from one another at right angles, a joint is provided at the point of intersection of said two axes, consisting essentially of a casing which is arranged horizontally around one of said axes and which is open at least at the top and in which there is mounted a centre member which is rotatable about the other of said axes, the casing being mounted on one of said surveying plate and rotational shaft and the centre member being connected to the other of said rotational shaft and surveying plate.

According to one embodiment of the invention, the centre member of the joint is connected to the rotational shaft by means of a pivot and an intermediate member, the pivot being ball-bearing mounted in the centre member and said centre member being rotatable to a limited extent about the pivot. Spindles extend along each of said two axes, the spindle extending along said one axis being secured to the centre member and the spindle of the other axis extending through holes in the centre member which holes are larger in diameter than the diameter of the spindle and so the spindle secured to the centre member of the joint is pivotable to a limited extent in relation to the other spindle and as a result displacement of the position of the two spindles in relation to one another, occurring during the adjustment of the inclination of these two spindles, is averted.

BRIEF DESCRIPTION OF THE DRAWINGS

The invention will now be further described, by way of example, with reference to the drawings, in which.

DETAILED DESCRIPTION OF PREFERRED EMBODIMENT

Figure 1:
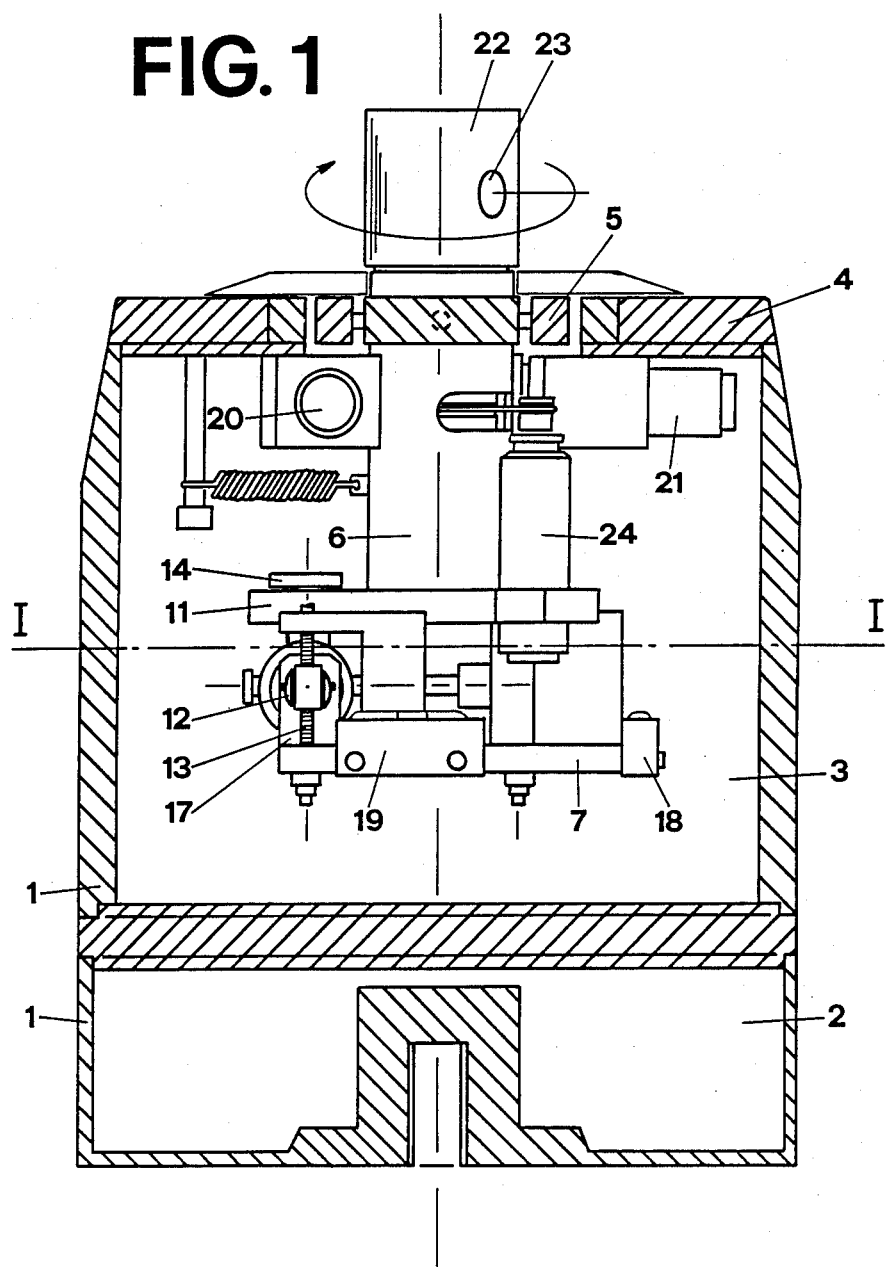
FIG. 1 is a vertical longitudinal cross-section through one embodiment of a laser beam levelling instrument according to the invention.
Figure 2:
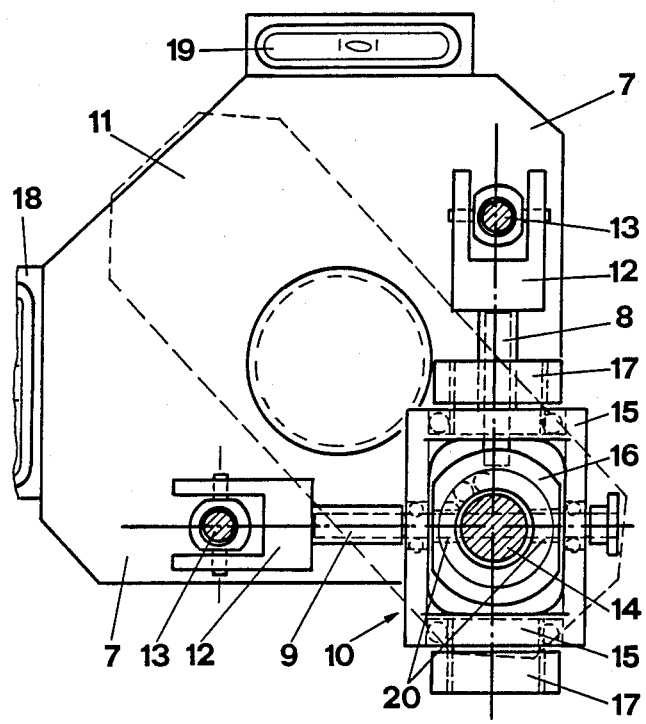
FIG. 2 is a section taken on the line I-I in FIG. 1.
Figure 3:
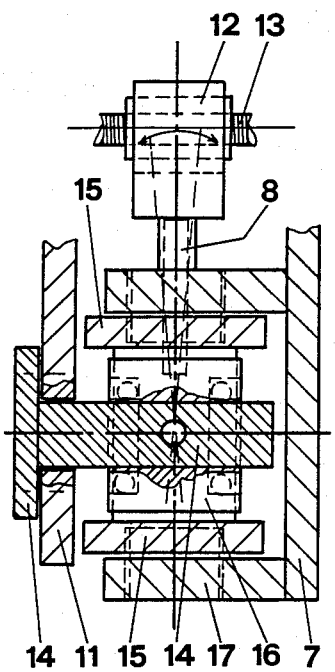
FIG. 3 is a partial longitudinal section through the joint of the instrument shown in FIGS. 1 and 2.
Figure 4:
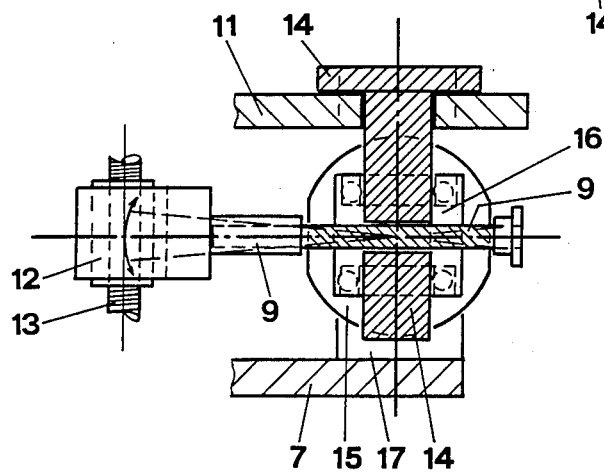
FIG. 4 is a partial cross-section through the joint shown in FIG. 3.

Referring to the drawings, the essential functional components of the laser-beam levelling instrument according to the invention are housed in a cylindrical casing 1 which comprises a lower casing part 2 and an upper casing part 3. Electric batteries (not shown) are located in the lower casing part 2 and serve as a power supply for the instrument. The upper casing part 3 is provided with a cover 4 having a centrally positioned hole through which passes vertically a pipe length 6. This pipe length 6 constitutes the rotational shaft of the laser and is mounted in gimbals 5 in the cover 4 so that it can be swung crosswise by its end. A light source producing laser light is housed in the lower part of the pipe length 6. Below the end of the pipe length 6 there is a horizontal surveying plate 7 which is indirectly secured to the pipe length.

Disposed on this surveying plate 7 are two spindles 8 and 9 facing away from one another at right angles. At the point of intersection of these two spindles there is a joint 10 which consists essentially of a tubular casing 15 disposed horizontally and round the first spindle 8. The casing 15 is open at least at the top and in it there is mounted a centre member 16 which is rotatable about the second spindle 9. The casing is mounted on the self-levelling surveying plate 7 and the centre member 16 is connected to the rotational shaft of the laser or to the pipe length 6. The spindle 9 is ball-bearing mounted on the casing 15 by means of two flanged ball bearings.

At the ends 12 of the two spindles 8 and 9 opposite to the joint 10 there are means for varying the inclination of these spindles in relation to the plane of the surveying p late 7. These means may appropriately consist of screw-threaded rods 13, each of which is mounted on the surveying plate 7 and on each of which the end 12 of the respective spindle 8 or 9 can travel vertically. The two spindles 8 and 9 are each held in their respective spindle end piece 12 for free rotation and displacement in the longitudinal direction.

For correct operation, the pivotal axis of the joint casing 15 should be the same as the pivotal axis of the outer movable gimbal 5 of the gimbal suspension of the rotational shaft of the laser and pipe length 6.

The centre member 16 of the joint 10 is connected to the pipe length 6 by means of a pivot 14 and an intermediate member 11, the pivot 14 being ball-bearing mounted in the centre member 16 of the joint 10 and the centre member 16 being rotatable to a limited extent about the pivot 14 in that holes 20 in said centre member through which the second spindle 9 is taken through the centre member 16 of the joint and the pivot 14, are larger in diameter than the diameter of the spindle 9 and so the first spindle 8 secured to the centre member 16 of the joint is pivotable to a limited extent in relation to the second spindle 9 and, as a result, displacement in the position of the two spindles 8, 9 in relation to one another, occurring during adjustment of the inclination of these two spindles 8, 9, is averted. The casing 15 of the joint 10 is secured to the surveying plate 7 being ball-bearing mounted on vertical arms 17.

Two spirit levels 18 and 19 are fitted to the surveying plate 7 at right angles to one another and are filled with a liquid which conducts electric current. Each spirit level 18, 19 contains electric contact points for operating two circuits. The current of the two circuits of each level enables electric motors 20 and 21 for each level to run forwards or backwards. The two electric motors 20 and 21 are secured to the underside of the cover 4 of the upper casing part 3. The electric motors 20 and 21 each have an eccentric shaft, which shafts come into contact with the circumferential surface of the pipe length 6.

The surveying plate 7 should always lie horizontally. If the surveying plate 7 deviates from the horizontal, the electric current ensures that the surveying plate 7 is brought back into the horizontal through the two levels 18 and 19 and through the electric motors 20 and 21.

Mounted for rotation in the upper end of the pipe length 6 is a further pipe length which carries, at its free end, a head 22 with an aperture 23. A pentagonal prism for deflecting a laser beam arriving vertically from the light source at the lower part of the pipe length 6 into a horizontal beam is provided in the head 22 and the aperture 23 serves as a window for allowing the horizontal beam to emerge from the head 22. The further pipe length, together with the head 22, can be set in continuous rotation by means of a third electric motor 24 through an endless rubber belt. A receiver (not shown) renders visible the laser beam emerging invisibly and horizontally from the window 23.

In order to incline the laser plane, the two screw-threaded rods 13 are turned independently of one another, during which the spindles 8 and 9 move downwards or upwards by their ends 12, to the extent corresponding to the rotation. The rotation of each of the screw-threaded rods 13 may be effected by means of an electric motor (not shown) which is controlled through a keyboard on the casing 1. The desired inclination value, usually between 0 and 10%, can now be fed in separately for each of the two spindles 8 and 9. The inclination of the spindles 8 and 9 is transmitted to the surveying plate 7. The surveying plate 7, however, is always kept horizontal by the automatic levelling described previously. Thus the desired inclination is ultimately transmitted through the rotational shaft 6 of the laser to the reference plane radiated by the rotating laser. Reference can now be made to this laser plane, aligned for example in a longitudinal gradient of 5% and in a transverse gradient of 3% and the area of ground to be worked or checked can be compared therewith.

The joint construction described ensures that when the one axis of inclination is adjusted, the other axis of inclination remains uninfluenced and stable in its inclination and direction. Since the individual components are always frictionally connected to one another, shaking during transport of the instrument cannot lead either to an alteration of the values fed in or to damage or wear of the components. Since the joint 10 is arranged laterally beside the rotational shaft of the laser, the laser light source is easily accessible and can be exchanged without any problems.

Other embodiments and modifications are envisaged without departing from the spirit and scope of the invention as defined by the appended claims.

I claim:

1. A laser-beam levelling instrument comprising a rotational shaft, a self-levelling surveying plate, means for producing a vertical laser beam and rotatable reflection means for deflecting said vertical laser beam into a horizontal beam, said beam deflecting means being mounted on said rotational shaft and said shaft being suspended vertically and pivotable in a horizontal plane, means being provided for the automatic levelling of the surveying plate in a horizontal plane and said surveying plate being able to be inclined in two axes facing away from one another at right angles, a joint provided at the point of intersection of said two axes consisting of a casing which is arranged horizontally around one of said axes and which is open at least at the top and in which there is mounted a centre member which is rotatable about the other of said axes, the casing being mounted on one of said surveying plate and rotational shaft and the centre member being connected to the other of said rotational shaft and surveying plate.

2. A laser-beam levelling instrument as claimed in claim 1, in which the centre member of the joint is connected to the rotational shaft by means of a pivot and an intermediate member, the pivot being ball-bearing mounted in the centre member and said centre member being rotatable to a limited extent about the pivot, and in which spindles extend along each of said two axes, the spindle extending along said one axis being secured to the centre member and the spindle of the other axis extending through holes in the centre member which holes are larger in diameter than the diameter of the spindle and so the spindle secured to the centre member of the joint is pivotable to a limited extent in relation to the other spindle and as a result displacement of the position of the two spindles in relation to one another, occurring during the adjustment of the inclination of these two spindles, is averted.

3. A laser-beam levelling instrument as claimed in claim 2, in which means for varying the inclination of said spindles in relation to the said horizontal plane of the surveying plate are provided on the ends of said spindles remote from the joint.

4. A laser-beam levelling instrument as claimed in claim 3, in which said inclination varying means comprise, in each case, a screw-threaded rod which is mounted on the surveying plate and on which the end of the spindle is mounted for vertical travel.

5. A laser-beam levelling instrument as claimed in claim 1, and further comprising an outer casing, the said rotational shaft being mounted in said outer casing by means of gimbals.

6. A laser-beam levelling instrument as claimed in claim 5, in which the joint casing and said gimbals have pivotal axes which coincide with one another.

7. A laser-beam levelling instrument as claimed in claim 1, in which the surveying plate is provided with a pair of ball-bearings mounted on arms extending at right angles to said plate, each arm containing a ball-bearing, and the joint casing being secured to said surveying plate by means of a spindle mounted in said ball-bearings.

* * * * *